(12) United States Patent
Pearl, Jr. et al.

(10) Patent No.: US 10,781,357 B2
(45) Date of Patent: Sep. 22, 2020

(54) HYDRATION PERFORMANCE OF MICROCELLULOSE IN CEMENT

(71) Applicant: Halliburton Energy Services, Inc., Houston, TX (US)

(72) Inventors: William Cecil Pearl, Jr., Spring, TX (US); Krishna M. Ravi, Kingwood, TX (US); Romildo Dias Toledo Filho, Rio de Janeiro (BR); Saulo Rocha Ferreira, Rio de Janeiro (BR); Iolanda Scheibe De Siqueira, Rio de Janeiro (BR)

(73) Assignee: Halliburton Energy Services, Inc., Houston, TX (US)

(*) Notice: Subject to any disclaimer, the term of this patent is extended or adjusted under 35 U.S.C. 154(b) by 157 days.

(21) Appl. No.: 16/070,673

(22) PCT Filed: Mar. 4, 2016

(86) PCT No.: PCT/US2016/020839
§ 371 (c)(1),
(2) Date: Jul. 17, 2018

(87) PCT Pub. No.: WO2017/151143
PCT Pub. Date: Sep. 8, 2017

(65) Prior Publication Data
US 2019/0085233 A1     Mar. 21, 2019

(51) Int. Cl.
| C09K 8/467 | (2006.01) |
| C04B 28/02 | (2006.01) |
| C04B 20/10 | (2006.01) |
| C04B 20/00 | (2006.01) |
| C04B 24/38 | (2006.01) |

(52) U.S. Cl.
CPC ............ *C09K 8/467* (2013.01); *C04B 20/008* (2013.01); *C04B 20/1066* (2013.01); *C04B 24/383* (2013.01); *C04B 28/02* (2013.01); *C09K 2208/04* (2013.01)

(58) Field of Classification Search
CPC .. C09K 8/467; C09K 2208/04; C04B 20/008; C04B 20/1066; C04B 24/383; C04B 28/02
See application file for complete search history.

(56) References Cited

U.S. PATENT DOCUMENTS

| 3,852,200 A | 12/1974 | Meyer |
| 4,244,987 A | 1/1981 | Aydin et al. |
| 5,275,699 A | 1/1994 | Allan et al. |
| 6,063,738 A | 5/2000 | Chatterji et al. |
| 6,379,501 B1 | 4/2002 | Zhang et al. |
| 6,392,034 B1 | 5/2002 | Trusovs |
| 8,807,216 B2 | 8/2014 | Karcher et al. |
| 2007/0123434 A1 | 5/2007 | Lewis et al. |
| 2013/0092056 A1 | 4/2013 | Scharlemann et al. |
| 2013/0274149 A1 | 10/2013 | Lafitte et al. |
| 2014/0020895 A1 | 1/2014 | Agapiou et al. |
| 2015/0072902 A1 | 3/2015 | Schlumberger |

FOREIGN PATENT DOCUMENTS

| CN | 108546029 A | * | 9/2018 | |
| EP | 3075715 A1 | * | 10/2016 | ......... C04B 40/0064 |
| JP | 05-254905 | | 10/1993 | |
| JP | 05254905 A | * | 10/1993 | |
| WO | WO-2011051882 A1 | * | 5/2011 | ............. D21H 11/20 |
| WO | WO-2016164037 A1 | * | 10/2016 | ......... C04B 2103/12 |
| WO | WO-2016187362 A1 | * | 11/2016 | ............... C04B 7/02 |

OTHER PUBLICATIONS

Peters et al, "Nanocellulose and Microcellulose Fibers for Concrete", Transportation Research Record, Journal of he Transportation Research Board, No. 2142, pp. 25-28. (Year: 2010).*
"Metal Nanoparticles on Natural Cellulose Fibers: Electrostatic Assembly and in Situ Synthesis" dong et al. dated Mar. 26, 2009.
"Study of the Interactions of Calcium Ions with Lignin, Cellulose, and Pectin" Torre et al. 1992.
Thakur, Vijay Kumar, (2014) Lignocellulosic Polymer Composites: Processing, Characterization, and Properties, John Wiley & Sons, Oct. 30, 2014, U.S., Section 19.2.4.
"Microcrystalline cellulose as a reinforcement agent to cement pastes" Mohammed et al. 2014.
International Search Report for PCT/US2016/020839 dated Jan. 13, 2017.
"Inversion Algorithms for Large-Scale Geophysical Electromagnetic Measurements" Abubakar et al. dated Dec. 3, 2009.

* cited by examiner

*Primary Examiner* — Anthony J Green
(74) *Attorney, Agent, or Firm* — Thomas Rooney; C. Tumey Law Group PLLC

(57) ABSTRACT

A variety of systems, methods and compositions are disclosed, including, in one method, a method of cementing may comprise providing a cement composition comprising a hydraulic cement, water, and a microcellulose additive, wherein the microcellose additive may comprise microcellulose with a metal deposited on a surface of the microcellose, wherein the metal may be selected from the group consisting of an alkali metal, an alkaline earth metal, and combinations thereof; placing the cement composition in a selected location; and allowing the cement composition to set.

19 Claims, 6 Drawing Sheets

HYDRATION PERFORMANCE OF MICROCELLULOSE IN CEMENT

BACKGROUND

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. Cement compositions also may be used in surface applications, for example, construction cementing.

Changes in pressure and/or temperature in the wellbore over the life of the well, as well as, pressure testing, well completion operations, hydraulic fracturing, and hydrocarbon production may compromise zonal integrity. Compromised zonal integrity may often be the result of cracking or plastic deformation in the cement composition, or de-bonding between the cement composition and either the wellbore or the casing. Compromised zonal integrity affects safety and may require expensive remedial operations.

Conventional cement compositions have the limitation of shrinking during cement hydration if an external source of fluid, for example, water, is not available. The shrinkage of the cement composition can result in the above-mentioned stresses that lead to damage of the cement sheath. In some instances, such as certain combinations of depth and formation properties, even when external fluid is available, the cement sheath may become stressed during cement hydration and may not be able to withstand subsequent well operations. Therefore, a cement composition that can compensate for cement hydration volume reduction is desirable for cement operations.

BRIEF DESCRIPTION OF THE DRAWINGS

These drawings illustrate certain aspects of some of the systems, methods and compositions of the present disclosure, and should not be used to limit or define the systems, methods and/or cement compositions.

DETAILED DESCRIPTION

Figure 1:
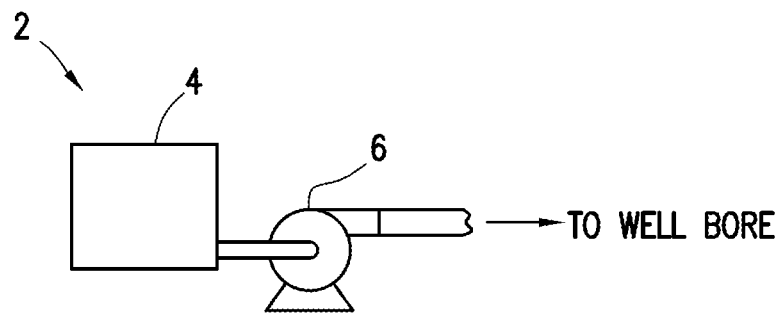
FIG. 1 is a schematic diagram that illustrates a system for preparation and delivery of a cement composition to a wellbore in accordance with certain examples.

Systems, methods, and compositions are directed to microcellulose ("MC") additives and, in certain systems and methods, to cement compositions comprising MC additives and methods of cementing with MC additives in subterranean applications. There may be several potential advantages to the systems, methods and cement compositions of the present disclosure, only some of which may be alluded to herein. One of the many potential advantages of the systems, methods and cement compositions of the present disclosure is that the MC additive may improve mechanical properties of the cement composition by increasing strength via increasing Pozzolanic activity. Another potential advantage of the systems, methods and cement compositions of the present disclosure is that the MC additive may reduce permeability of the cement composition. In contrast to natural fibers that commonly undesirably retard setting of the cement compositions, the MC additives may reinforce the cement compositions with the retardation effect commonly seen with natural fibers reduced or potentially even eliminated.

The cement compositions may be foamed or unfoamed or may comprise other means to reduce their densities, such as hollow microspheres, low-density elastic beads, or other density-reducing additives known in the art. Unfoamed cement compositions may comprise a cement, an MC additive, and water. When foamed, the foamed cement composition may comprise a cement, an MC additive, water, and a gas. Foaming surfactants may also be included in the foamed cement compositions. Those of ordinary skill in the art will appreciate that the cement compositions generally should have a density suitable for a particular application. When foamed, the foamed cement compositions may have a density in the range from about 4 lb/gal to about 13 lb/gal, alternatively, about 9 lb/gal to about 13 lb/gal, or alternatively, about 7 lb/gal to about 9 lb/gal. By way of example, the unfoamed cement composition may have a density in the range from about 4 pounds per gallon ("lb/gal") to about 20 lb/gal, alternatively, about 8 lb/gal to about 17 lb/gal. Those of ordinary skill in the art, with the benefit of this disclosure, will recognize the appropriate density for a particular application.

The cement compositions may comprise a cement. Any of a variety of cements suitable for use in subterranean cementing operations may be used in accordance with systems, methods and cement compositions of the present disclosure. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain systems, methods and cement compositions, the hydraulic cement may comprise a Portland cement. Portland cements that may be suited for use in systems, methods and cement compositions of the present disclosure may be classified as Class A, C, H and G cements according to American Petroleum Institute, API Specification for Materials and Testing for Well Cements, API Specification 10, Fifth Ed., Jul. 1, 1990. In addition, in some systems, methods and cement compositions, hydraulic cements suitable for use in the present disclosure may be classified as ASTM Type I, II, or III.

The cement compositions may comprise an MC additive. The MC additive may comprise MC with a metal deposited on a surface of the MC. The metal may be selected from alkali metals, alkaline earth metals or combinations thereof. The addition of MC to cement compositions may modify the cement compositions' rheology. The MC additive may increase the performance of the cement compositions because the MC fibers may have a greater surface area and reactivity with cement compositions than conventional fibers having lengths ranging from about 1.5 to about 10 mm. The MC additive may also have a positive effect on water absorption by increasing absorption resistance because the MC additive may modify pore structures of the cement compositions. Additionally, the MC fiber size may increase the surface/volume ratio, i.e., for the same amount of fibers, MC fibers may have a better distribution than conventional sized fibers in various volumes of cement compositions. MC may contain both crystalline and amorphous regions. MC may exist as particulate aggregates or "crystallites," ranging in diameter from about 0.15 to about 10.0 microns, with many of the particles having a diameter less than 1 micron, and ranging in length from about 10 to about 200 microns.

MC may be extracted from the cellulose microfibrils from various cellulosic sources. MC may be extracted from wood, bacteria, bleached kraft pulp, bleached sulfite pulp, sugar beet pulp, wheat straw, soy hulls, sisal, bagasse, palm trees, ramie, carrots, luffa cylindrica, or any combination thereof. A variety of mechanical defibrillation methods may be used, including high-pressure homogenization, grinding, ultrasonication, cryocrushing and high-speed blending. The resulting MC may be rigid, rod-shape like with high surface area.

The MC may have a metal selected from the group consisting of alkali metals, alkaline earth metals, and combinations thereof deposited on a surface of the MC. It is believed that materials, such as extractives, lignin, and/or hemicellulose, for example, may be contained on natural fibrous materials and that these material may slow the hydration performance of the cement composition. Accordingly, by deposition of the metal on the surface of the MC, it is believed that the metal may replace and/or cover these materials. Without limitation, the presence of the metal on the surface of the MC may allow the MC to overcome typical retardation effects encountered when adding fibrous material, such as MC, to cement compositions. By way of example, the wait on cement time may be reduced when the MC additive is used as compared to the use of the MC that does not contain the metal. Alkali earth metals may include metals from Group 2 of the periodic table, including, without limitation, magnesium, calcium, barium, strontium, or combinations thereof. Alkali metals may include metals from Group 1 of the periodic table, including, without limitation, lithium, sodium, and potassium, or combinations thereof.

Any suitable technique may be used to apply the metal to the surface of the MC. By way of example, the MC may be treated with an alkali metal or alkaline earth metal hydroxide to deposit the metal on the surface of the MC. Treatment of the MC may include contacting the MC with a water solution of a metal hydroxide, an aqueous metal hydroxide, or a combination thereof. A magnetic stirrer, for example, may be used to provide agitation (stirring speed, for example, may be about 600 rpm). The metal hydroxide and/or aqueous metal hydroxide may be included in the water solution up to its saturation limit. Optionally, additional metal hydroxide and/or aqueous metal hydroxide may be included in the water solution such that additional metal particles may be suspended in the water solution. The MC may be contacted with the water solution for a time period of up to about 10 minutes or longer. By way of example, the MC may be contacted with the water solution for about 10 minutes to about 120 minutes or alternatively for about 30 minutes to about 60 minutes. Without limitation, the MC may be contacted with the water solution for about 10 minutes, about 20 minutes, about 30 minutes, about 40 minutes, about 50 minutes, about 60 minutes, or even longer. The contact with water solution may occur at any suitable temperature. For example, the contact with water solution may occur at room temperature or elevated temperatures. Without limitation, the contact may occur at a temperature ranging from about 20° C. to about 100° C. and, alternatively, from about 40° C. to about 90° C., such as at about 40° C., about 50° C., about 60° C., about 70° C., about 80° C., or about 90° C. One of ordinary skill in the art, with the benefit of this disclosure, should be able to select an appropriate time period and temperature for the contact with the water solution. After the contact with the water solution, the MC may be filtered and then dried, for example, to provide an MC additive in a dry, solid form.

Without limitation, the ratio of MC to the metal hydroxide used in the treatment may range from about 1:4 to about 4:1. By way of example, the ratio of the MC to the metal hydroxide may range from about 3:1 to about 1:1. More particular, the ratio of the MC to the metal hydroxide may be about 1:4, about 1:2, about 3:4, about 1:1, about 4:3, about 2:1, or about 4:1. However, it should be understood that ratios of the MC to the metal hydroxide outside these ranges may also be used in particular applications. Any suitable alkali metal and/or alkaline metal hydroxide may be used for the treatment, including, without limitation, calcium hydroxide, sodium hydroxide, lithium hydroxide, potassium hydroxide, magnesium hydroxide, barium hydroxide, strontium hydroxide, or any combination thereof.

Optionally, application of the metal to the surface of the MC may include a pre-wash and/or post-wash with water. By way of example, the MC may be contacted with water for a period of time either prior to treatment with the metal hydroxide, after treatment with the metal hydroxide, and/or both prior to and after treatment with the metal hydroxide. The MC may be contacted with the water for a time period of up to about 10 minutes or longer. By way of example, the MC may be contacted with the water in the pre-wash or the post-wash for about 10 minutes to about 120 minutes or alternatively for about 30 minutes to about 60 minutes. Without limitation, the MC may be contacted with the water for about 10 minutes, about 20 minutes, about 30 minutes, about 40 minutes, about 50 minutes, about 60 minutes, or even longer. After the contact with the water, the MC may be filtered and then dried. The contact with water may occur at any suitable temperature. For example, the contact with water may occur at room temperature or elevated temperatures. Without limitation, the contact may occur at a temperature ranging from about 20° C. to about 100° C. and, alternatively, from about 40° C. to about 90° C., such as at about 40° C., about 50° C., about 60° C., about 70° C., about 80° C., or about 90° C. One of ordinary skill in the art, with the benefit of this disclosure, should be able to select an appropriate time period and temperature for the pre-wash and/or post-wash.

The MC additive may enhance the mechanical properties of cement compositions by reducing shrinkage and permeability, and increasing Pozzolanic activity. Additionally, the MC additive may increase compressive strength of the cement compositions while reducing weight of the cement compositions. Lower ratios of MC within the cement compositions may increase compressive strength of the cement compositions more than higher ratios of MC. Further, MC may not react or alter other cement constituents in the cement compositions. The MC additive may also increase flexural resistance and impact strength of the cement compositions. Young's Modulus and cohesion may also play an important role in the integrity of the cement compositions, and may increase with the addition of MC.

The MC additive may decrease workability. Cement compositions may be workable if they are easily transported, placed, compacted and cured without any segregation of constituents. The MC additive may also increase temperature during a curing process of the cement compositions.

The MC additive may be included in the cement compositions in an amount sufficient for a particular application. The MC additive may have a positive effect on water absorption by increasing absorption resistance because MC may modify pore structures of the cement compositions. The MC may delay a hydration reaction within the cement composition, as well as, increase the degree of hydration of the cement compositions. Without limitation, the MC additive may be included in a cement composition in an amount in a range of from about 0.1% to about 10% by weight of cement ("bwoc") and, alternatively, from about 0.5% to about 2% bwoc. For example, the MC additive may be included in a cement composition in an about of about 0.1%, about 0.5%, about 1%, about 2%, about 4%, about 6%, about 8%, or about 10% bwoc. One of ordinary skill in the art, with the benefit of this disclosure, should be able to select an appropriate amount of the MC additive to use for a particular application.

If MC is utilized within foamed cement compositions, the foamed cement compositions may be foamed at the well site. By way of example, the cement compositions may be foamed immediately prior to use. The cement compositions may be foamed with a foaming surfactant and by entraining gas into the cement compositions. The cement compositions may be foamed, for example, to provide a cement composition with a reduced density.

The gas used for foaming the composition may be any suitable gas for foaming, including, but not limited to: air, nitrogen, and combinations thereof. Generally, the gas should be in an amount sufficient to form the desired foam. Foaming surfactants may be included to facilitate foaming and/or stabilize the resultant foam formed therewith.

The foaming surfactants may include a surfactant or combination of surfactants that reduce the surface tension of the water. By way of example, the foaming surfactant may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as a alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; $C_8$ to $C_{22}$ alkylethoxylate sulfates; and combinations thereof. Specific examples of suitable foaming agents include mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable foaming surfactants are ZONESEAL-ANT™ 2000 surfactant and Foamer 1026™, both available from Halliburton Energy Services Inc., Houston, Tex. The cement compositions may be foamed within a foam quality range of between about 5% to about 80% and, more particularly, from about 18% to about 38%. As used herein, the term "foam quality" refers to the volume of entrained gas and is defined by the following formula: Foam Quality=(Total Foam Volume−Liquid Volume)/Total Foam Volume. Generally, the foaming surfactant may be present in an amount sufficient to provide a suitable foam. Without limitation, the foaming surfactant may be present in an amount in the range from about 0.5% to about 5% by volume of the water ("bvow").

The water used in the foamed and unfoamed cement compositions may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, the water may be present in an amount sufficient to form a pumpable slurry. In certain cement compositions, the water may be present in the cement composition in an amount in the range of about 33% to about 200% bwoc. For example, the water may be present in the cement composition in the range of about 35% to about 70% bwoc. One of ordinary skill in the art with the benefit of this disclosure will recognize the appropriate amount of water for a chosen application.

Other additives suitable for use in subterranean cementing operations also may be added to the cement compositions as desired by those of ordinary skill in the art. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, thixotropic additives, and combinations thereof. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

Weighting agents are typically materials that weigh more than water and may be used to increase the density of the cement compositions. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the cement compositions to, for example, decrease the density of the cement compositions. Examples of suitable lightweight additives include, but are not limited to, bentonite, coal, gilsonite, hollow microspheres, low-density elastic beads, nitrogen, pozzolan-bentonite, sodium silicate, combinations thereof, or other lightweight additives known in the art.

Gas-generating additives may be included in the cement compositions to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Mechanical-property-enhancing additives may be included in the cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in the cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Defoaming additives may be included in the cement compositions to, for example, reduce the tendency for the cement compositions to foam during mixing and pumping of the cement compositions. Examples of suitable defoaming additives include, but are not limited to, polyol silicone compounds. Suitable defoaming additives are available from Halliburton Energy Services, Inc., under the product name D-AIR™ defoamers.

Thixotropic additives may be included in the cement compositions to, for example, provide a cement composition that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The cement compositions may set to have a desirable compressive strength. Compressive strength is generally the capacity of a material or structure to withstand axially directed pushing forces. The compressive strength may be measured at a specified time after preparation of the cement composition while the cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the cement compositions may develop a 24-hour compressive strength in the range of from about 50 psi to about 5000 psi, alternatively, from about 100 psi to about 4500 psi, or alternatively from about 500 psi to about 4000 psi. Without limitation, the cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures above 400° F. may be of particular importance for potential use in subterranean formations having relatively high bottom hole static temperatures.

In some examples, the cement compositions may have desirable thickening times. Thickening time typically refers to the time a fluid, such as the cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the cement composition to reach 70 Bc and may be reported as the time to reach 70 Bc. The cement compositions may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 500° F., alternatively, in a range of from about 250° F. to about 500° F., and alternatively at a temperature greater than about 400° F.

In accordance with the systems, methods and cement compositions of the present disclosure, a cement composition may be introduced into a selected location and allowed to set therein. As will be appreciated, the selected location may any suitable location above ground or in a subterranean formation where it is desired for the cement composition to set into a hardened mass. For example, the selected location may be an annulus between a pipe string located in a subterranean formation and the subterranean formation. As described above, the systems, methods and cement compositions of the present disclosure generally comprise a cement, the MC additive, and water.

As will be appreciated by those of ordinary skill in the art, the systems, methods and cement compositions of the present disclosure may be used in a variety of subterranean applications, including primary and remedial cementing. The cement compositions may be introduced into a well bore and allowed to set. The systems, methods and cement compositions may comprise cement, the MC, and water. By way of example, in example primary cementing applications, a cement composition may be introduced into an annular space between a subterranean formation and a pipe string (or between a pipe string and a larger pipe string) located in the subterranean formation. The cement composition may be allowed to set to form a hardened mass in the annular space. In addition, in example remedial cementing applications, a cement composition may be used, for example, in squeeze cementing operations or in the placement of cement plugs.

A method of cementing may comprise providing a cement composition comprising a hydraulic cement, water, and a microcellulose additive, wherein the microcellose additive may comprise microcellulose with a metal deposited on a surface of the microcellose, wherein the metal may be selected from the group consisting of an alkali metal, an alkaline earth metal, and combinations thereof; placing the cement composition in a selected location; and allowing the cement composition to set. The cement composition may have a density in a range of from about 4 pounds per gallon to about 20 pounds per gallon, and wherein the water may be present in an amount sufficient to form a pumpable slurry. The hydraulic cement may comprises at least one hydraulic cement selected from the group consisting of Portland cement, pozzolan cement, gypsum cement, high-alumina-content cement, slag cement, silica cement, and any combination thereof. The microcellulose may comprise at least one microcellulose fiber derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof. The microcellulose additive may be present in the cement composition in an amount of about 0.1% to about 10% by weight of the cement composition. The microcellulose may have a diameter ranging from about 0.15 microns to about 10.0 microns. The microcellulose may have a length from about 10 microns to about 200 microns. The microcellulose may have been treated with a metal hydroxide to deposit the metal on a surface of the microcellulose, wherein the metal hydroxide may be selected from the group consisting of alkali metal hydroxides, alkaline earth metal hydroxides, and combinations thereof. A weight ratio of the microcellulose to the metal hydroxide may be about 4:1 to about 1:4. The method may further comprise contacting the microcellulose with a water solution of a metal hydroxide to deposit the metal on the surface of the microcelluose. The selected location may be a wellbore annulus in a primary cementing operation. The selected location may be in a well bore in a subterranean formation.

A cement composition may comprise a hydraulic cement, water, and a microcellulose additive, wherein the microcellose additive may comprise microcellulose with a metal deposited on a surface of the microcellose, wherein the metal may be selected from the group consisting of an alkali metal, an alkaline earth metal, and combinations thereof. The cement composition may have a density in a range of from about 4 pounds per gallon to about 20 pounds per gallon, and wherein the water may be present in an amount sufficient to form a pumpable slurry, wherein the hydraulic cement may comprise at least one hydraulic cement selected from the group consisting of Portland cement, pozzolan cement, gypsum cement, high-alumina-content cement, slag cement, silica cement, and any combination thereof. The microcellulose may comprises at least one microcellulose fiber derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof. The microcellulose may be present in the cement composition in an amount of about 0.1% to about 10% by weight of the cement composition. The microcellulose may have a length from about 10 microns to about 200 microns. The microcellulose may have been treated with a metal hydroxide to deposit the metal on a surface of the microcellulose, wherein the metal hydroxide may be selected from the group consisting of alkali metal hydroxides, alkaline earth metal hydroxides, and combinations thereof.

A cementing system may comprise a cement composition comprising a hydraulic cement, water, and a microcellulose additive, wherein the microcellose additive may comprise microcellulose with a metal deposited on a surface of the microcellulose, wherein the metal may be selected from the group consisting of an alkali metal, an alkaline earth metal, and combinations thereof; mixing equipment capable of mixing the cement composition; and pumping equipment capable of delivering the cement composition into a wellbore. The microcellulose may comprise at least one microcellulose fiber derived from at least on cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

Referring now to FIG. 1, preparation of a cement composition in accordance with example systems, methods and cement compositions will now be described. FIG. 1 illustrates a system 2 for preparation of a cement composition and delivery to a wellbore in accordance with certain systems, methods and cement compositions. As shown, the cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art. In some systems, methods and compositions, a jet mixer may be used, for example, to continuously mix the MC additive with the water (and other cement compositions) as it is being pumped to the wellbore.

Figure 2A:
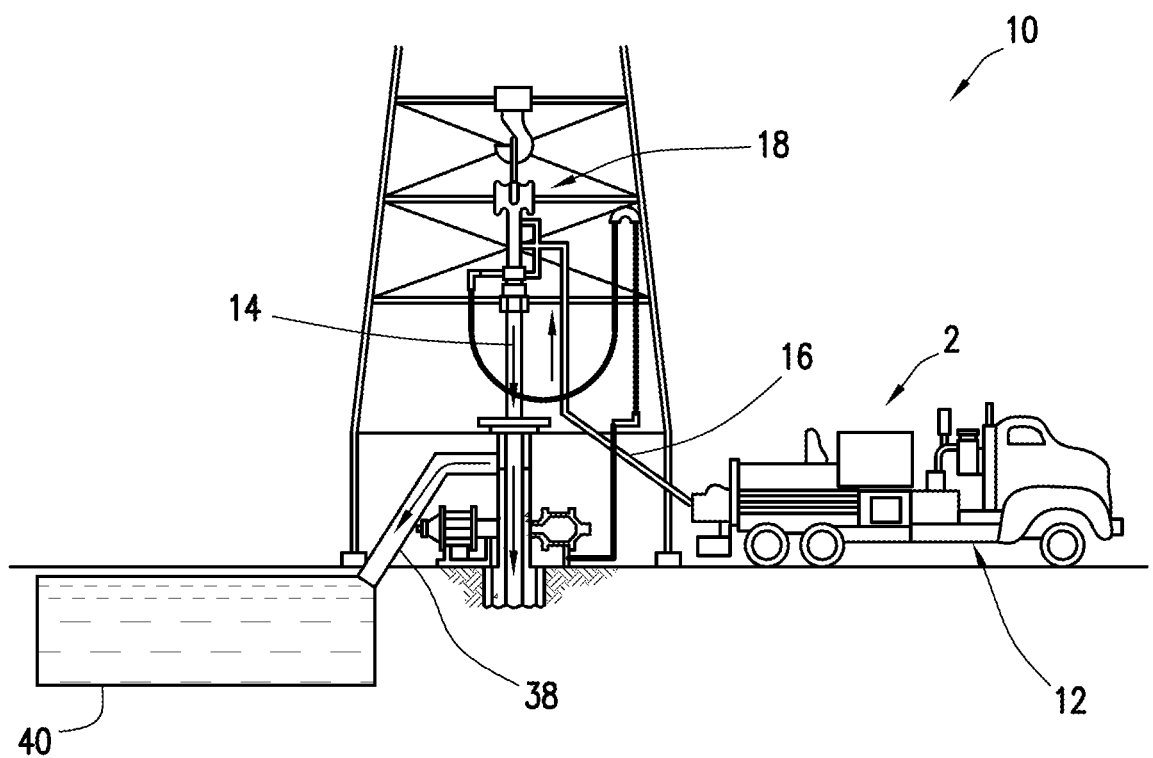
FIG. 2A is a schematic diagram that illustrates surface equipment that may be used in placement of a cement composition in a wellbore in accordance with certain examples.

An example technique for placing a cement composition into a subterranean formation will now be described with reference to FIGS. 2A and 2B. FIG. 2A illustrates surface equipment 10 that may be used in placement of a cement composition in accordance with certain systems, methods and cement compositions. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
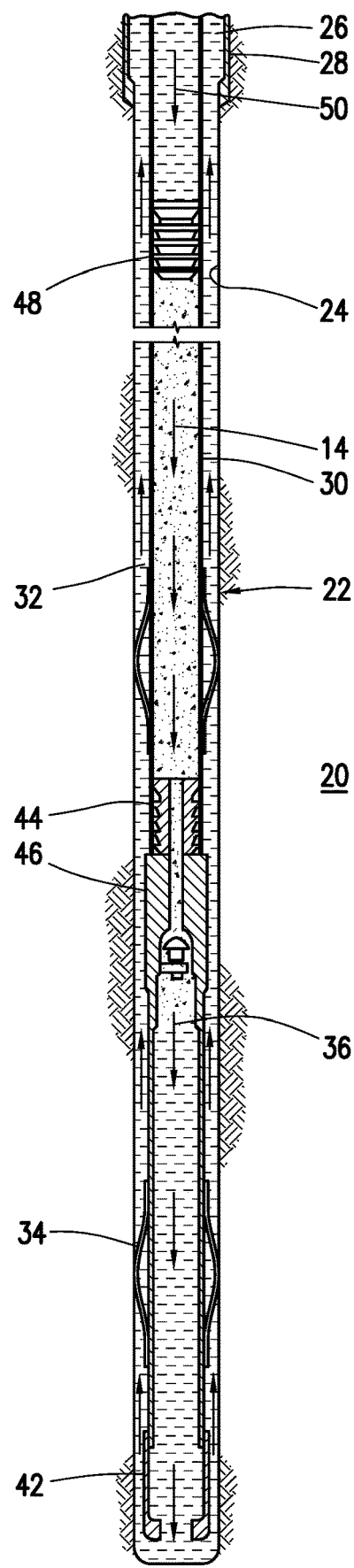
FIG. 2B is a schematic diagram that illustrates placement of a composition into a wellbore annulus in accordance with certain examples.

Turning now to FIG. 2B, the cement composition 14 may be placed into a subterranean formation 20 in accordance with example systems, methods and cement compositions. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the cement composition 14. The top plug 48 may separate the cement composition 14 from a displacement fluid 50 and also push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like To facilitate a better understanding of the present disclosure, the following examples of certain aspects of some of the systems, methods and cement compositions are given. In no way should the following examples be read to limit, or define, the entire scope of the disclosure.

Example 1

The following example was performed to analyze the effect of MC on the hydration effects of a cement composition. MC was obtained and mixed with water and a cement at two different concentrations. Sample 1 included the MC in a concentration of 0.5% by weight of the cement ("bwoc"). Sample 2 included in the MC in a concentration of 1.0% bwoc. A Reference Sample was also prepared that did not include the MC. The cement used was Portland cement class G (Density: 3.25 g/cm$^3$/27.12 lb/gal), available from Holcim. Water was included in the samples in an amount of about 45% bwoc.

Figure 3:
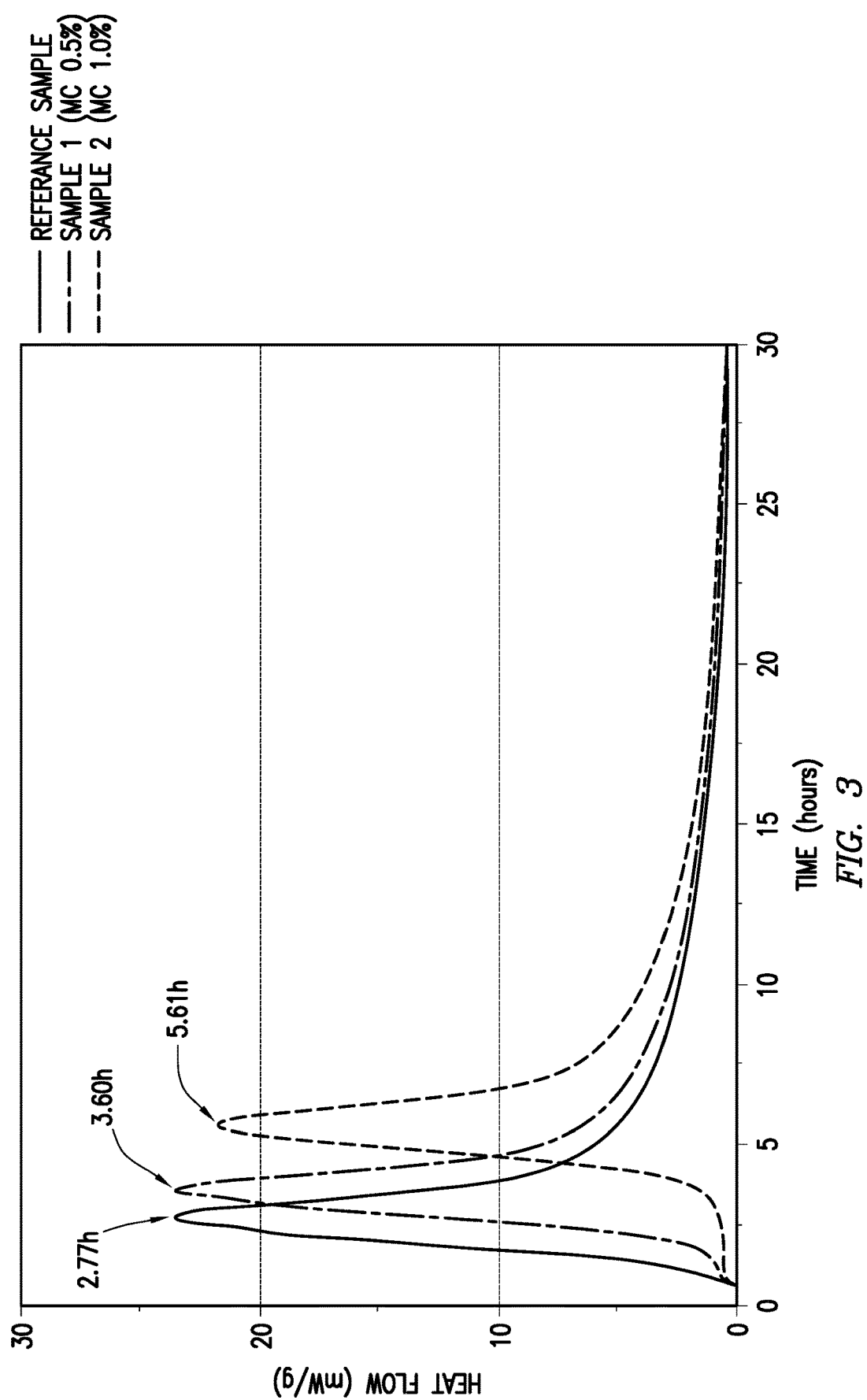
FIG. 3 is a graph that illustrates isothermal calorimetry tests with microcellulose at 65° C.

After preparation of the samples, isothermal calorimetry tests were performed on the samples at 65° C. The results of the isothermal calorimetry tests are provided on FIG. 3. From these tests, the wait-on-cement times for the samples were 2.77 hours for the Reference Sample, 3.6 hours for Sample 1, and 5.61 hours for Sample 2. Accordingly, this example shows that MC without treatment with a metal retarded hydration of the cement composition. For example, Sample 2 with 1% bwoc of the MC slowed the reaction for approximately 2 hours and 50 minutes, as compared to Reference Sample 1 without inclusion of the MC.

Example 2

The following example was performed to further analyze the effect of MC on the hydration effects of a cement composition. In particular, the example was performed to analyze the effect of MC treated with a metal hydroxide solution (e.g., calcium hydroxide solution) as compared to MC that was untreated or only treated with a water wash. Before inclusion in the samples, the MC was treated with various combinations of water wash and/or treatment with a calcium hydroxide solution. In particular, the MC was treated with various combinations of the following steps:

W1: Washing the MC in water for 1 hour at 80° C. with a proportion of 0.73% of MC by weight.

T: Washing the MC with a water solution of calcium hydroxide for 50 minutes at room temperature. The proportion of calcium hydroxide was 0.73% by weight and the weight ratio of MC to calcium hydroxide was 2.

T2: Washing the MC with a water solution of calcium hydroxide for 50 minutes at room temperature. The proportion of calcium hydroxide was 0.185% by weight (saturation) and the weight ratio of MC to calcium hydroxide was 2.

W2: Washing the MC in water for 10 minutes at room temperature.

After each step, the samples were filtered with a filter paper and then dried at 60° C.

Various samples (designated herein as Samples 3 to 12) were then prepared by combining the MC, whether treated with only a water wash or also with a calcium hydroxide solution, by adding the MC to a cement composition in a concentration of 1% bwoc or 6% bwoc. A Reference Sample was also prepared that did not include the MC. The cement used was Portland cement class G (Density: 3.25 g/cm$^3$/27.12 lb/gal), available from Holcim. Water was included in the samples in an amount of about 45% bwoc.

Figure 4:
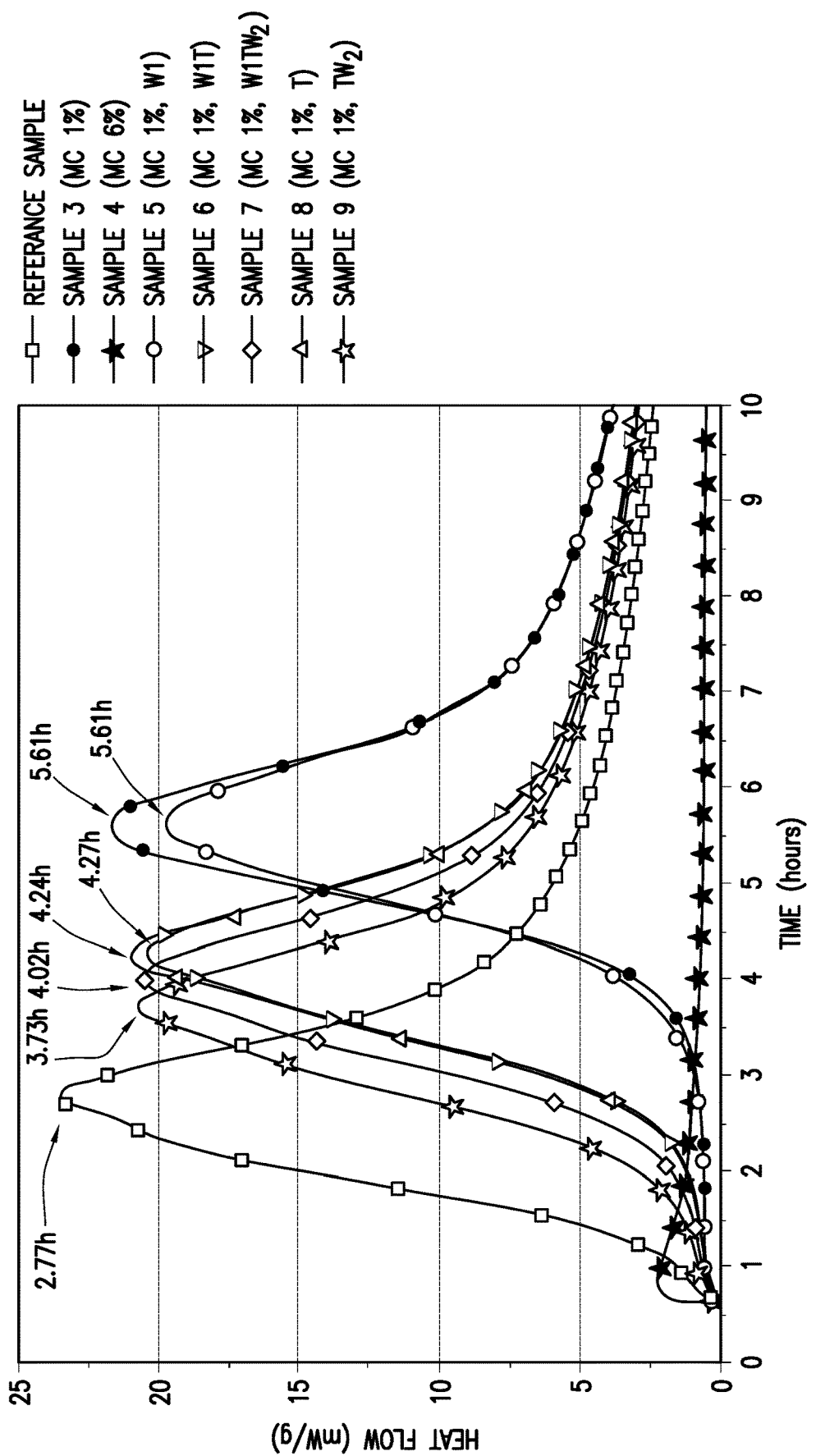
FIGS. 4 and 5 are graphs that illustrate isothermal calorimetry tests for cement compositions containing microcellulose treated and untreated.
Figure 5:
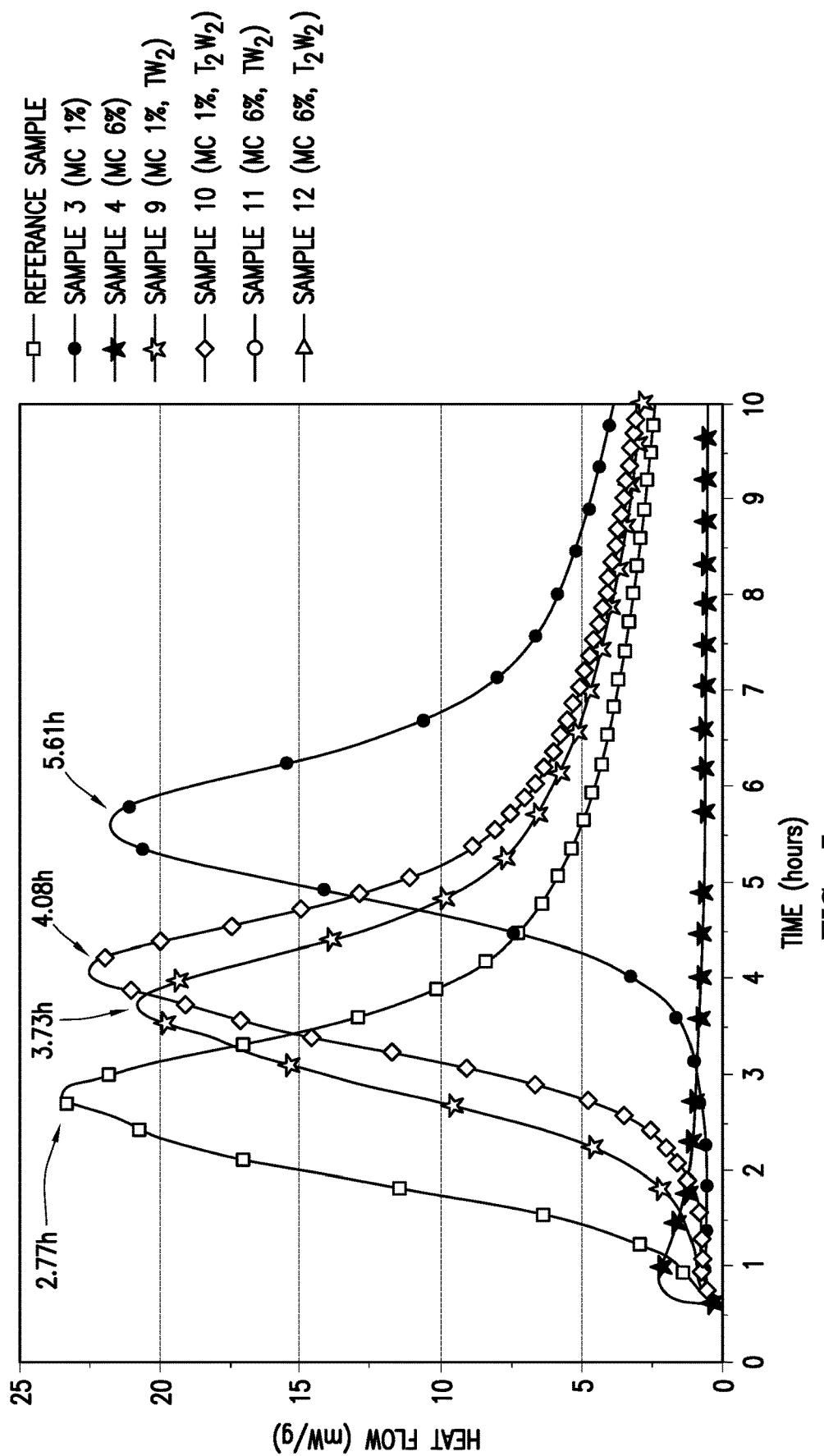

After preparation of the samples, isothermal calorimetry tests were performed on the samples at 65° C. The results of the isothermal calorimetry tests are provided on FIGS. 4 and 5. The wait on cement times and particular samples are provided below. The wait on cement time may be reduced to 3.73 hours (Sample 9) from 5.61 hours (Sample 3). This is only slightly longer than the Reference Sample without any MC which has a wait-on-cement time of 2.77 hours. Accordingly, treatment of the MC with the calcium hydroxide may only now extend the cement set by 32% vs 100% with untreated MC, which is a significant improvement.

The wait-on-cement time for the Reference Sample that did not include the MC was 2.77 hours.

Sample 3 included the MC in an amount of 1% bwoc. The MC included in Sample 3 was untreated MC that was not treated with either the water wash or the calcium hydroxide solution. The wait-on-cement time for Sample 3 was 5.61 hours.

Sample 4 included the MC in an amount of 6% bwoc. The MC included in Sample 3 was untreated MC that was not treated with either the water wash or the calcium hydroxide solution. The wait-on-cement time for Sample 4 was 0.8 hours.

Sample 5 included the MC in an amount of 1% bwoc. The MC included in Sample 5 was only treated with water wash step W1 and was not treated with the calcium hydroxide solution. The wait-on-cement time for Sample 5 was 5.61 hours.

Sample 6 included the MC in an amount of 1% bwoc. The MC included in Sample 6 was treated with the first water wash step W1 following by treatment with the first calcium hydroxide treatment T. The wait-on-cement time for Sample 6 was 4.7 hours.

Sample 7 included the MC in an amount of 1% bwoc. The MC included in Sample 7 was treated with the first water wash step W1 following by treatment with the first calcium hydroxide treatment T. The MC was then further treated with a second water wash step W2. The wait-on-cement time for Sample 7 was 4.02 hours.

Sample 8 included the MC in an amount of 1% bwoc. The MC included in Sample 8 was only treated with the first calcium hydroxide treatment T and was not treated with a water wash. The wait-on-cement time for Sample 8 was 4.24 hours.

Sample 9 included the MC in an amount of 1% bwoc. The MC included in Sample 9 was treated with the first calcium hydroxide treatment T followed by the second water wash step W2. The wait-on-cement time for Sample 9 was 3.73 hours.

Sample 10 included the MC in an amount of 1% bwoc. The MC included in Sample 10 was treated with the second calcium hydroxide treatment T2 followed by the second water wash step W2. The wait-on-cement time for Sample 10 was 4.08 hours.

Sample 11 included the MC in an amount of 6% bwoc. The MC included in Sample 11 was treated with the first calcium hydroxide treatment T followed by the second water wash step W2. The wait-on-cement time for Sample 11 was 0.56 hours.

Sample 12 included the MC in an amount of 6% bwoc. The MC included in Sample 12 was treated with the second calcium hydroxide treatment T2 followed by the second water wash step W2. The wait-on-cement time for Sample 12 was 0.9 hours.

Figure 6:
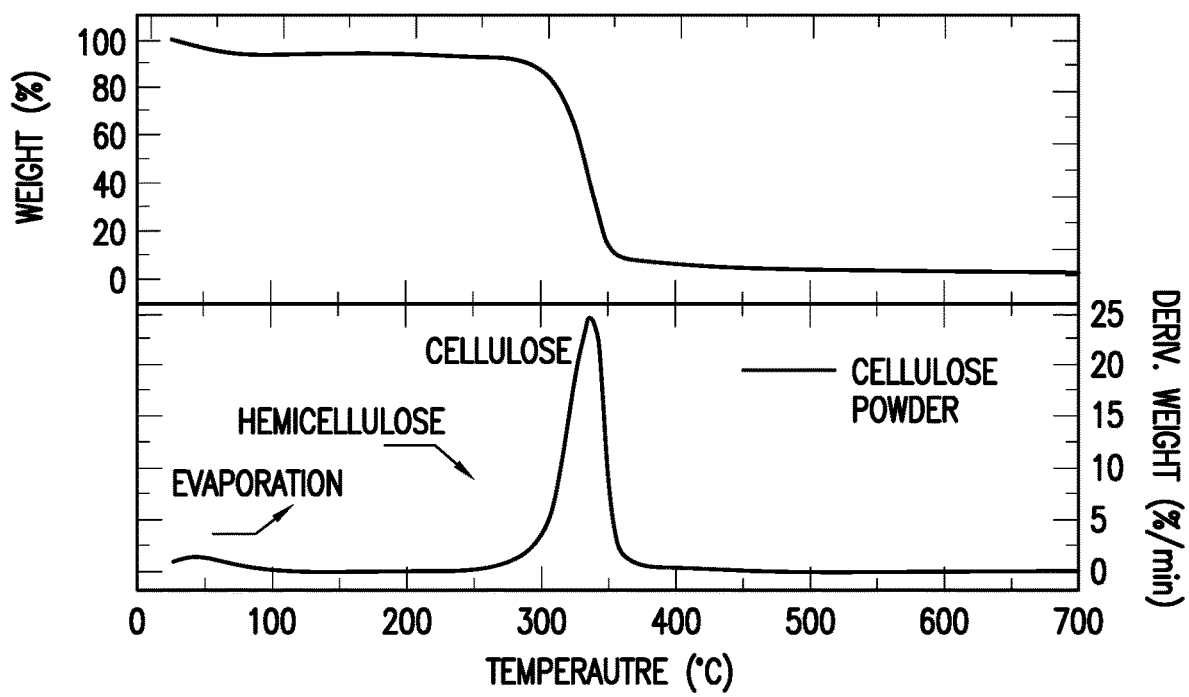
FIGS. 6 and 7 are graphs that illustrate thermal gravimetric analysis of microcellulose before and after treatment with a calcium hydroxide solution.
Figure 7:
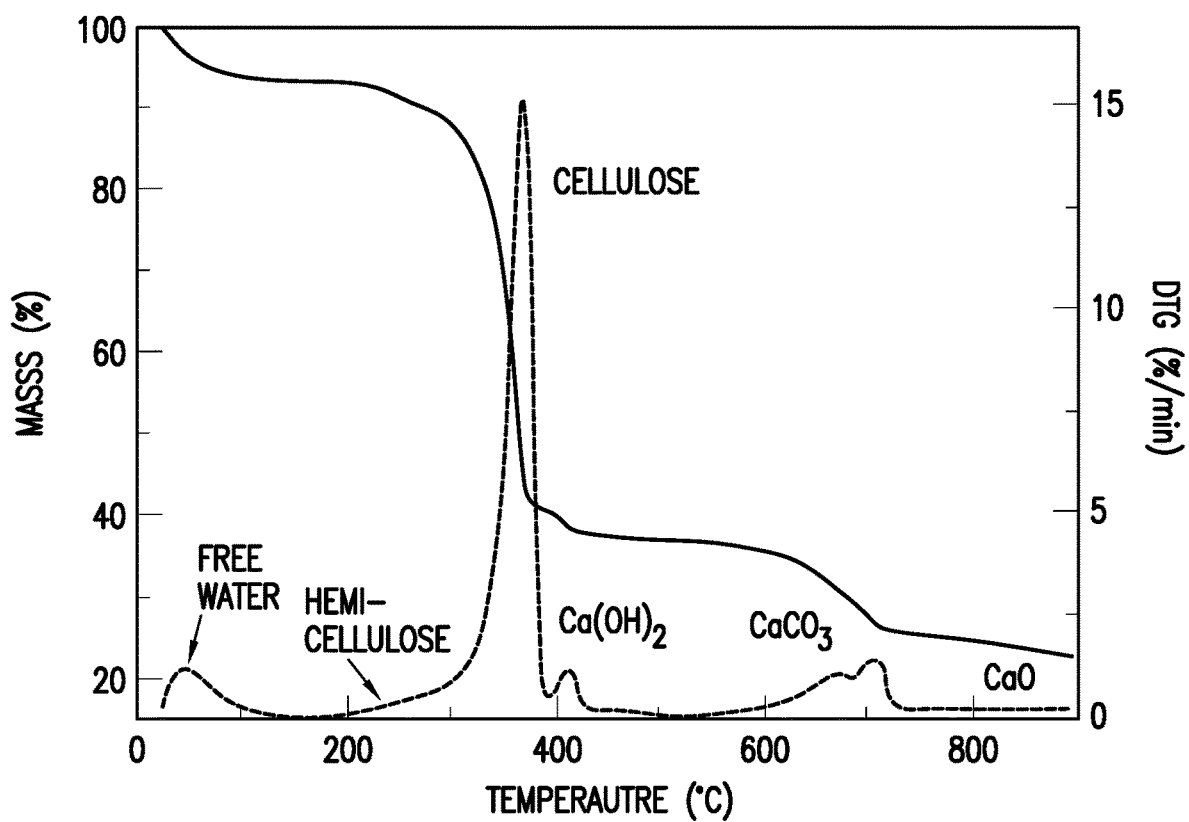

The treated and untreated MC was also analyzed with a scanning electron microscope. New clusters were observed on the treated MC, which EDC analysis showed a high content of calcium. Thermogravimetric analysis of the treated MC also confirmed that the treated MC retained some of the calcium from treatment with the calcium hydroxide solution. The thermographic analysis is illustrated on FIGS. 6 and 7, wherein FIG. 6 is the analysis before treatment and FIG. 7 is the analysis after treatment. TW2 was performed on the MC that was further subject to SEM and TGA analysis.

Therefore, the present disclosure is well adapted to attain the ends and advantages mentioned as well as those that are inherent therein. The particular systems, methods and cement compositions disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative systems, methods and cement compositions disclosed above may be altered or modified and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing comprising:
   providing a cement composition comprising;

a hydraulic cement,
water, and
a microcellulose additive, wherein the microcellulose additive comprises microcellulose treated with a metal hydroxide to deposit a metal on a surface of the microcellulose, wherein a weight ratio of the microcellulose to the metal hydroxide is about 4:1 to about 1:4, and wherein the metal is selected from the group consisting of an alkali metal, an alkaline earth metal, and combinations thereof;
placing the cement composition in a selected location; and
allowing the cement composition to set.

2. The method of claim 1, wherein the cement composition has a density in a range of from about 4 pounds per gallon to about 20 pounds per gallon, and wherein the water is present in an amount sufficient to form a pumpable slurry.

3. The method of claim 1, wherein the hydraulic cement comprises at least one hydraulic cement selected from the group consisting of Portland cement, pozzolan cement, gypsum cement, high-alumina-content cement, slag cement, silica cement, and any combination thereof.

4. The method of claim 1, wherein the microcellulose comprises at least one microcellulose fiber derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

5. The method of claim 1, wherein the microcellulose additive is present in the cement composition in an amount of about 0.1% to about 10% by weight of the cement composition.

6. The method of claim 1, wherein the microcellulose has a diameter ranging from about 0.15 microns to about 10.0 microns.

7. The method of claim 1, wherein the microcellulose has a length from about 10 microns to about 200 microns.

8. The method of claim 1, wherein the metal hydroxide is selected from the group consisting of alkali metal hydroxides, alkaline earth metal hydroxides, and combinations thereof.

9. The method of claim 1, further comprising contacting the microcellulose with a water solution of the metal hydroxide to deposit the metal on the surface of the microcellulose.

10. The method of claim 1, wherein the selected location is a wellbore annulus in a primary cementing operation.

11. The method of claim 1, wherein the selected location is in a well bore in a subterranean formation.

12. A cement composition comprising:
a hydraulic cement,
water, and
a microcellulose additive, wherein the microcellulose additive comprises microcellulose treated with a metal hydroxide to deposit a metal on a surface of the microcellulose, wherein a weight ratio of the microcellulose to the metal hydroxide is about 4:1 to about 1:4, wherein the metal is selected from the group consisting of an alkali metal, an alkaline earth metal, and combinations thereof.

13. The cement composition of claim 12, wherein the cement composition has a density in a range of from about 4 pounds per gallon to about 20 pounds per gallon, and wherein the water is present in an amount sufficient to form a pumpable slurry, wherein the hydraulic cement comprises at least one hydraulic cement selected from the group consisting of Portland cement, pozzolan cement, gypsum cement, high-alumina-content cement, slag cement, silica cement, and any combination thereof.

14. The cement composition of claim 12, wherein the microcellulose comprises at least one microcellulose fiber derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

15. The cement composition of claim 12, wherein the microcellulose is present in the cement composition in an amount of about 0.1% to about 10% by weight of the cement composition.

16. The cement composition of claim 12, wherein the microcellulose has a length from about 10 microns to about 200 microns.

17. The cement composition of claim 12, wherein the metal hydroxide is selected from the group consisting of alkali metal hydroxides, alkaline earth metal hydroxides, and combinations thereof.

18. A cementing system comprising:
a cement composition comprising;
a hydraulic cement,
water, and
a microcellulose additive, wherein the microcellulose additive comprises microcellulose treated with a metal hydroxide to deposit a metal on a surface of the microcellulose, wherein a weight ratio of the microcellulose to the metal hydroxide is about 4:1 to about 1:4, wherein the metal is selected from the group consisting of an alkali metal, an alkaline earth metal, and combinations thereof;
mixing equipment capable of mixing the cement composition; and
pumping equipment capable of delivering the cement composition into a wellbore.

19. The cementing system of claim 18, wherein the microcellulose comprises at least one microcellulose fiber derived from at least one cellulosic source selected from the group consisting of bacteria, wood, bleached kraft pulp, bleached sulfite pulp, sugar beet pulp, wheat straw, soy hulls, sisal, bagasse, palm trees, ramie, carrots, luffa cylindrica and any combination thereof.

* * * * *